March 21, 1950     F. J. NAGEL ET AL     2,501,349

INSULATION FOR MAGNETIC MATERIAL

Filed May 10, 1946

INSULATING FILM COMPRISING THE REACTION PRODUCT OF FERROUS METAL WITH PHOSPHORIC ACID AND AN ACID SELECTED FROM GROUP CONSISTING OF FLUOSILICIC, SILICOTUNGSTIC AND PHOSPHOTUNGSTIC ACIDS.

FERROUS METAL

WITNESSES:

INVENTORS
Fritz J. Nagel and
Clifford C. Horstman.
BY James N. Ely
ATTORNEY

Patented Mar. 21, 1950

2,501,349

UNITED STATES PATENT OFFICE 2,501,349

INSULATION FOR MAGNETIC MATERIAL

Fritz J. Nagel, Pittsburgh, and Clifford C. Horstman, Sharpsville, Pa., assignors to Westinghouse Electric Corporation, East Pittsburgh, Pa., a corporation of Pennsylvania Application May 10, 1946, Serial No. 668,683

4 Claims. (Cl. 148—6.15)

This invention relates to electrical insulation and more particularly to tenaciously adherent insulating films having a high ohmic resistance applied to magnetic materials.

In preparing magnetic materials, such, for example, as silicon iron, for the building of magnetic cores therefrom, it is necessary that the laminations be provided with electrical insulation between one another in order to minimize eddy currents and to achieve low losses. The insulation should preferably be an extremely thin film to provide for a high space factor. In many cases, it is further necessary that the insulating material applied to laminations should withstand the elevated temperatures which are encountered in strain annealing cores after assembly in order to improve their efficiency. Temperatures encountered in strain annealing frequently reach 1200° C. and are rarely less than 600° C. In addition, it is highly desirable that the insulation for the magnetic sheet material be tightly adherent and capable of withstanding bending, scraping and other mechanical abuse or chemical treatment which may be encountered in forming the magnetic material to shape and assembling cores therefrom. Magnetic material is usually cut, slit, or punched after the insulating material is applied thereto, and thereafter the cut or punched magnetic material may be bent or wound in order to produce a predetermined core structure and heat-treated to remove strains. Additionally, the assembled cores may be subjected to machining or grinding, and, in some cases, etching with acids in order to remove burrs and the like.

It has been discovered that ferrous magnetic material may be treated with an aqueous solution containing a substantial amount of phosphoric acid and a complex inorganic acid selected from the group consisting of fluosilicic, silicotungstic and phosphotungstic acids, and when heat-treated at temperatures ranging from 400° C. to 1200° C., a chemical reaction takes place that produces on the surface of the magnetic material thin films characterized by high ohmic resistance and extreme hardness. Numerous other advantages of the films will be set forth hereinafter.

The object of this invention is to provide on ferrous metal surfaces tenaciously adherent films possessing high ohmic resistance.

Other objects of the invention will in part be obvious, and will in part appear hereinafter. For a better understanding of the nature and objects of the invention reference should be had to the following detailed description and drawing, in which.

In order to provide on ferrous magnetic material the thin insulating films of this invention, the magnetic material is coated with an aqueous composition containing from 1 to 30 parts by weight of an inorganic acid selected from the group consisting of fluosilicic, silicotungstic and phosphotungstic acids, and from 10 to 50 parts by weight of orthophosphoric acid and then heat-treated at about 400° C. or higher up to about 1200° C. The aqueous composition may contain these ingredients in high concentration, if relatively thick films are desired. If thin films are desired the aqueous composition may be relatively dilute with respect to the acidic ingredients.

The aqueous composition may be applied to ferrous metals of all kinds. Silicon iron having from 1% to 7% silicon, as extensively used for preparing magnetic cores, reacts with the composition upon heat-treatment to produce thin translucent films that adhere quite tenaciously. Sheet silicon iron from less than 1 mil to 25 mils in thickness or even heavier material is easily treated with the composition. Ferrous metal containing aluminum, cobalt, nickel and the like may be treated. Furthermore, wire, bar, strap, castings and other forms of ferrous material may be readily provided with an insulating film by applying the acidic composition thereto and heat-treating.

The following examples are typical of the application of the invention:

Example I

Silicon iron having 3.25% silicon was treated with a solution prepared by mixing:

| | Parts by weight |
|---|---|
| Distilled water | 50 |
| Fluosilicic acid, 29% | 50 |
| Phosphoric acid, 85% | 40 |

Figure 1:
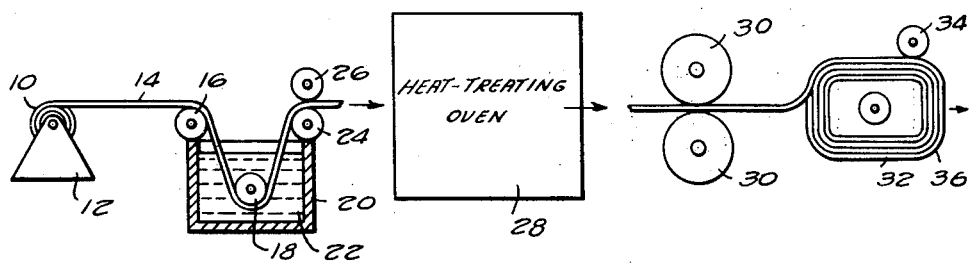
Figure 1 is a schematic view, partly in section, of apparatus for carrying out one form of the invention.

This solution was applied to the silicon iron in the apparatus illustrated in Fig. 1 of the drawing. A roll 10 of sheet silicon iron mounted on a stand 12 was unwound and the sheet silicon iron 14 was passed over a guide roll 16, thence under a roll 18 mounted within the tank 20 whereby the sheet 14 was submerged in the solution 22 having the composition above described. The sheet metal 14 with the coating of aqueous composition acquired in passing through the solution 22 was passed between the squeeze rolls 24 and 26 composed of a resilient material, such as rubber, to control the thickness of the layer of applied composition. The coated sheet was then heat-treated in the oven 28 at a temperature of 750° C. for one minute. Examination of the sheet after the heat-treatment indicated that a translucent hard film of a thickness of the order of 0.1 mil was present on the surfaces of the sheet 14.

Subsequently the coated sheet 14 was formed into a magnetic core by passing it through tension control rolls 30 from whence it was wound on a rectangular mandrel 32 rotating in a clockwise direction. A compression roll 34 mounted resiliently was applied to compact the turns 36 in order to produce a magnetic core having a high space factor. The magnetic material could be readily wound into a core such as 36 having corners with radii of the order of one-eighth inch without any substantial difficulty. The wound core 36 was then strain-annealed in a furnace at a temperature of the order of 600° C. to 1250° C. The space factor was from 96% to 99%. The film was not fused or softened during the strain-annealing and no adhesions between laminations occurred and consequently no increase in eddy current losses occurred on alternating current fields being applied thereto.

When tested for ohmic resistance between contacts applied under a pressure of 50 pounds per square inch, the resistance of the film was infinity. Even after twisting the contacts several times, the resistance remained at an extremely high value of between 100 ohms per square centimeter and infinity. The film present on the magnetic sheets was so hard that it abraded the copper alloy contacts when they were twisted. The hardness of the film is indicated by the fact that it was not appreciably abraded by iron or steel.

A further advantage of the product carrying the film was its resistance to oxidation. The ferrous magnetic material did not corrode even under wet conditions and when exposed to the atmospheres conducive to rusting for prolonged periods of time. As is well known to those skilled in the art, rusting of laminations of magnetic material is a considerable problem, since it increases the relative thickness of the laminations and presents many other electrical and manufacturing problems. The coating of this invention effectively eliminates the problem of rusting of ferrous laminations.

*Example II*

| | Parts by weight |
|---|---|
| Water | 50 |
| Phosphoric acid, 85% | 50 |
| Fluosilicic acid, 29% | 10 |

When applied to magnetic laminations of silicon iron, and heat-treated for 30 seconds at 750° C., the composition produced a thin film with high ohmic resistance corresponding to that of the film of Example I.

*Example III*

| | Parts by weight |
|---|---|
| Water | 100 |
| Phosphoric acid, 85% | 70 |
| Silicotungstic acid | 15 |

When applied to the magnetic sheet stock, the composition produced a dark blue coloration which disappeared on baking. After heat-treating 2 minutes at 900° C., a thin translucent film of a thickness of one-twelfth mil was secured. This film had excellent ohmic resistance of infinity when tested under the conditions described in Example I.

*Example IV*

| | Parts by weight |
|---|---|
| Water | 80 |
| Phosphoric acid, 65% | 90 |
| Phosphotungstic acid | 15 |

This composition, when applied to silicon iron sheets and heat-treated 2 minutes at 900° C., produced a film approximately 0.1 mil thick having an extreme hardness and a high ohmic resistance.

*Example V*

| | Parts by weight |
|---|---|
| Water | 100 |
| Phosphoric acid, 85% | 70 |
| Silicotungstic acid | 5 |

This composition was applied to ferrous magnetic material and baked one minute at 900° C. A tenaciously adherent film with a thickness of less than 0.1 mil was secured. The ohmic resistance was similar to that of Example I.

*Example VI*

| | Parts by weight |
|---|---|
| Water | 100 |
| Phosphoric acid, 85% | 70 |
| Phosphotungstic acid | 5 |

This composition was applied to laminations and baked at 850° C. for 1½ minutes, and produced a film having high ohmic resistance. This film was extremely thin and translucent.

*Example VII*

| | Parts by weight |
|---|---|
| Water | 60 |
| Phosphoric acid, 60% | 110 |
| Silicotungstic acid | 15 |

This composition, when applied to silicon iron having 3¼% silicon and heat-treated 2 minutes at 900° C., produced a translucent film 0.1 mil in thickness and having an ohmic resistance of approximately infinity when tested as described in Example I.

*Example VIII*

| | Parts by weight |
|---|---|
| Water | 85 |
| Phosphoric acid, 85% | 85 |
| Silicotungstic acid | 30 |

Upon heat-treating magnetic sheet material coated with the composition at a temperature of 900° C. for one minute, an extremely hard and abrasion-resistant film was produced on the sheet material. The ohmic resistance was greater than 100 ohms per square centimeter when tested according to the procedure of Example I.

The fluosilicic, silicotungstic and phosphotungstic acids may be combined with phosphoric acid individually or mixtures thereof may be employed, the concentration in aqueous solution preferably being not less than 1% of the complex inorganic acids. The aqueous compositions are stable indefinitely and may be prepared in any quantity desired and used as occasion arises, since they do not deteriorate on standing.

The fluosilicic acid has the formula $H_2SiF_6$. The silicotungstic acid employed had the formula $H_2SiW_{12}O_{40}$. Suitable compositions of phosphotungstic acid are $H_3PW_{12}O_{40}.14H_2O$ and $H_3PW_{12}O_{40}.24H_2O$. It will be apparent that these complex acids may be employed even when having compositions varying from the formulations given above without materially affecting their utility for the process herein disclosed.

Figure 2:
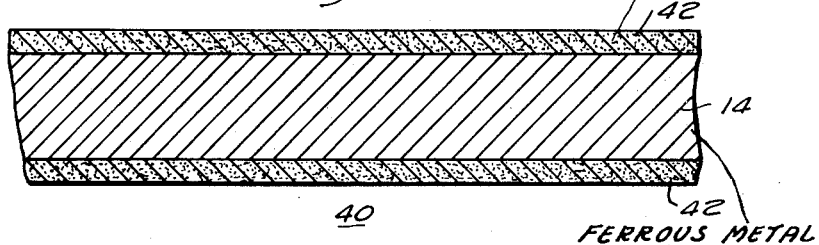
Fig. 2 is a fragmentary, greatly enlarged cross section through a sheet of magnetic material prepared in accordance with the invention.
Figure 3:
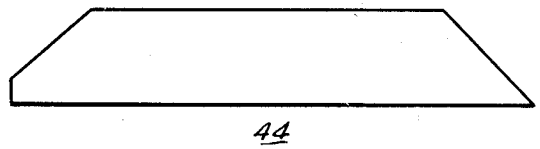
Fig. 3 is a plan view of a punched lamination.

Referring to Fig. 2 of the drawing, there is illustrated a greatly enlarged cross-sectional view through one of insulated sheets of ferrous magnetic material 40 composed of the magnetic material 14 proper and the thin, tenaciously adherent film 42 having the high ohmic resistance as produced by the reaction of the phosphoric acid and at least one of the complex inorganic acids herein disclosed. The film 42, due to its extreme hardness and tenacity will withstand a considerable amount of bending without rupturing or flaking off. It has been found, however, that the magnetic sheet material 40 may be stamped or punched into any predetermined type of flat laminations without any serious loss of the adherent film 42. Thus, the punching 44 shown in Fig. 3 of the drawing may be stamped in a suitable punch press from the sheet 40. It will be found that the insulation 42 will be present over substantially the entire surface of the punching 44. Due to the extreme thinness of the film 42, usually 0.1 mil or less in thickness, a desirable favorable space factor is secured upon stacking punchings such as 44, to produce a magnetic core.

The film 42 will not be disrupted by the normal handling encountered in production. Transformer dielectrics such as refined petroleum oil or halogenated dielectric liquids have no effect on the film 42. In some cases the core 36 shown in Fig. 1 must be cut and ground and etched in an acid such as sulphuric acid or hydrochloric acid in order to remove burrs. These acids under etching conditions have no observable effect when applied for short periods of time on the film 42. Burrs therefore may be easily acid etched without causing any difficulties by reason of rusting of the laminations or other deleterious effects.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

We claim as our invention:

1. An article of manufacture comprising a ferrous member and a tenaciously adherent film applied to the surfaces of the member, the film composed of the reaction product with the ferrous metal of an aqueous composition of from 10 to 50 parts by weight of phosphoric acid, from 1 to 30 parts by weight of at least one inorganic acid selected from the group consisting of silicotungstic and phosphotungstic acids and the balance being water to provide a total of 100 parts, and heat treated at a temperature of from about 400° C. to 1200° C.

2. A magnetic sheet comprising silicon iron having from about 1% to 7% silicon and a hard, adherent film possessing high ohmic resistance, the film being of the order of 0.1 mil in thickness, the film composed of the reaction product of the silicon iron with an aqueous composition of from 10 to 50 parts by weight of phosphoric acid, from 1 to 30 parts by weight of at least one inorganic acid selected from the group consisting of silicotungstic and phosphotungstic acids and the balance being water to provide a total of 100 parts, and heat treated at a temperature of from about 400° C. to 1200° C.

3. An aqueous composition comprising in combination, from 1% to 30% by weight of at least one inorganic acid selected from the group consisting of silicotungstic and phosphotungstic acids, from about 10% to 50% by weight of phosphoric acid and the balance water.

4. In the process of providing a tenaciously adherent film possessing high ohmic resistance on the surfaces of ferrous metal, the steps comprising applying to the surfaces of the ferrous metal an aqueous composition of from 1% to 30% by weight of at least one inorganic acid selected from the group consisting of silicotungstic and phosphotungstic acids, from 10% to 50% by weight of phosphoric acid, and the balance water, and heat-treating the ferrous metal and applied composition at a temperature of from 400° C. to 1200° C. to react the whole whereby to produce the insulating film.

FRITZ J. NAGEL.
CLIFFORD C. HORSTMAN.

REFERENCES CITED

The following references are of record in the file of this patent:

UNITED STATES PATENTS

| Number | Name | Date |
| --- | --- | --- |
| 921,350 | Bishop | May 11, 1909 |
| 1,022,274 | Strecker | Apr. 2, 1912 |
| 1,254,263 | Oeschger | Jan. 22, 1918 |
| 1,434,550 | McAdam et al. | Nov. 7, 1922 |
| 1,893,495 | Eberhard | Jan. 10, 1933 |
| 1,989,312 | Gerber | Jan. 29, 1935 |
| 2,161,319 | Schamberger | June 6, 1939 |
| 2,234,206 | Thompson | Mar. 11, 1941 |
| 2,257,960 | Humphrey | Oct. 7, 1941 |
| 2,276,353 | Thompson | Mar. 17, 1942 |
| 2,312,855 | Thompson | Mar. 2, 1943 |
| 2,413,949 | Broverman | Jan. 7, 1947 |

FOREIGN PATENTS

| Number | Country | Date |
| --- | --- | --- |
| 606,109 | Germany | Nov. 24, 1934 |